UNITED STATES PATENT OFFICE

1,949,837

SULPHODERIVATIVES OF HIGHER FATTY ACIDS

Georg Kalischer, Frankfort-on-the-Main, and Karl Keller, Frankfort-on-the-Main-Fechenheim, Germany, assignors to General Aniline Works, Inc., New York, N. Y., a corporation of Delaware No Drawing. Application May 27, 1930, Serial No. 456,277. In France November 4, 1929

5 Claims. (Cl. 260—112)

U. S. Patent 1,851,102 relates to new derivatives of higher fatty acids containing a sulphonic acid group (SO$_3$H) obtained by acting with an aqueous solution of a water soluble sulphite on a water soluble salt of a halogenated higher fatty acid of the general formula:

$$C_nH_{2n+1-x-m}R_mHal_x—COOH,$$

wherein R means hydrogen or hydroxyl, $m$ the number 1 or more, $n$ a number more than 8 and $x$ 1 or more.

Our present invention relates to certain new embodiments of the above mentioned series of sulphoderivatives of higher fatty acids obtained according to the process described in our aforesaid patent by using as starting materials the conversion products formed by heating halogenated derivatives of higher fatty or hydroxy fatty acid compounds containing more than 8 carbon atoms and at least 2 halogen atoms with an alkaline acting agent selected from the group consisting of hydroxides and carbonates of alkali or alkaline-earth metals according to U. S. application, Serial Number 452,141, filed May 13, 1930, by Karl Keller entitled "New derivatives of higher fatty acids and process of making same".

In order to further illustrate our invention the following example is given, the parts being by weight and all temperatures in centigrade degrees; but we wish to be understood that our invention is not limited to the example given, nor to the exact conditions stated therein:—

Example 34 parts of the conversion product obtained by the action of a caustic potash solution on a hexachlorinated derivative of ricinoleic acid, having an unsaturated character and containing still 2 chlorine atoms in its molecule, are mixed at room temperature with a solution of 5.5 parts of anhydrous sodium carbonate in about 150 parts of water. Then 60 parts of sodium sulphite are added and the mixture is heated for about 3 hours in an autoclave while stirring at 130–140°. The yellow oil obtained, swimming on the salt solution is separated. It may be dissolved in little water, the aqueous solution may be filtered from some impurities and evaporated to the desired degree of concentration. The product thus obtained is easily soluble in water and is distinguished by a very good resistance towards acid and lime and is a good protective colloid.

When using as starting material the conversion product obtained by the action of a caustic soda solution on hexachlororicinoleic acid containing besides hydroxyl-groups and double bonds only 1 chlorine atom in its molecule it is likewise possible to introduce the sulphonic acid residue into the fatty acid molecule by a stronger action of a sulphite. The product obtained corresponds in its properties to the product above described.

A similar product is formed when starting from the conversion product obtained by the action of a potassium carbonate solution on tetrachloro-oleic acid, containing besides hydroxyl-groups one chlorine atom in its molecule and having feeble unsaturated character.

When subjecting to the same treatment the conversion product obtained by the action of a caustic potash solution on hexachlorostearic acid, containing two chlorine atoms in its molecule (cf. Example 6 of Keller's application Serial No. 452,-141, filed May 13, 1930) the new product containing a sulphonic acid group represents a light yellow oil of similar properties.

The conversion product obtained by the action of a caustic soda solution on penta-chloropalmitic acid, containing hydroxyl groups and about 3 chlorine atoms in its molecule yields a new sulphonic acid derivative representing a light yellow oil of similar valuable properties.

We claim:—

1. As new compounds derivatives of higher fatty acids containing a sulphonic acid group which compounds are oils, suitable as protective colloids and which are stable towards acids and lime, being obtainable by the action of an aqueous solution of a water-soluble sulphite on a water-soluble salt of a halogen-containing conversion product having an unsaturated character formed by heating a halogenated fatty acid of the general formula $C_{17}H_{34-x}RHal_xCOOH$, wherein R means hydroxyl or hydrogen and $x$ the number 4 or more with an alkaline acting agent, selected from the group consisting of hydroxides and carbonates of alkali and alkaline earth metals with the addition of a diluent.

2. As a new compound a derivative of ricinoleic acid containing a sulphonic acid group which compound is an oil, suitable as a protective colloid and which is stable towards acids and lime, being obtainable by the action of an aqueous solution of a water-soluble sulphite on the water-soluble salt of the conversion product having an unsaturated character and containing two chlorine atoms in its molecule, formed by heating hexachlorinated ricinoleic acid of the formula $C_{17}H_{28}$(OH)Cl$_6$COOH with an alkaline acting agent, selected from the group consisting of hydroxides and carbonates of alkali and alkaline-earth metals with the addition of a diluent.

3. As a new compound, a derivative of oleic acid containing a suphonic acid group which compound is an oil, suitable as a protective colloid and which is stable towards acids and lime, being obtainable by the action of an aqueous solution of a water-soluble sulphite on a water-soluble salt of the conversion product, containing besides a hydroxyl group, one chlorine atom in its molecule and having a feeble, unsaturated character, formed by heating tetra-chloro-oleic acid of the formula $C_{17}H_{31}Cl_4COOH$ with an alkaline acting agent, selected from the group consisting of hydroxides and carbonates of alkali and alkaline-earth metals with the addition of a diluent.

4. As a new compound, a derivative of stearic acid containing a sulphonic acid group which compound is an oil, suitable as a protective colloid and which is stable towards acids and lime, being obtainable by the action of an aqueous solution of a water-soluble sulphite on a water-soluble salt of the conversion product containing two chlorine atoms in its molecule, having an unsaturated character formed by heating hexachloro-stearic acid of the formula $C_{17}H_{29}Cl_6COOH$ with an alkaline acting agent, selected from the group consisting of hydroxides and carbonates of alkali and alkaline-earth metals with the addition of a diluent.

5. A process for preparing new sulpho derivatives of higher fatty acids, suitable as protective colloids and being stable towards acids and lime, which comprises acting with an aqueous solution of a sulphite on a halogen-containing conversion product of fatty acids obtainable by heating an alkaline acting agent selected from the group consisting of hydroxides and carbonates of alkali and alkaline-earth metals with the addition of a diluent with a halogenated fatty acid of the general formula $C_{17}H_{34-x}RHal_xCOOH$, wherein R means hydroxyl or hydrogen and $x$ the number 4 or more, which conversion products contain halogen, hydroxy groups and double bonds.

GEORG KALISCHER.
KARL KELLER.